June 21, 1966 N. D. KANOOKOV ETAL 3,256,726
MILL FOR ROLLING SURFACES OF LINKS IN TRACTOR
AND SIMILAR CRAWLER CHAINS
Filed July 18, 1963 3 Sheets-Sheet 1

United States Patent Office 3,256,726
Patented June 21, 1966

3,256,726
MILL FOR ROLLING SURFACES OF LINKS IN TRACTOR AND SIMILAR CRAWLER CHAINS
Nikolai Danilovich Kanookov, Konstantin Petrovich Kosjakov, Victor Mikhailovich Popov, and Zafir Idrisovich Jusipov, all of Moscow, U.S.S.R., assignors to Moscovskoje Vysshee Tekhnicheskoje Uchilische "Bauman"
Filed July 18, 1963, Ser. No. 295,998
4 Claims. (Cl. 72—199)

This invention relates to apparatus designed for rolling the surfaces of links in tractor and similar crawler chains, and more particularly to apparatus for removing irregularities resulting from a forging operation from certain surfaces of these articles.

The process of manufacturing these articles utilized until recently consisted in the following: rolled strips of steel are cut by power shears into blanks of the proper size which are heated in furnaces and then forged with drop-hammers. The forgings thus obtained are then transferred to special presses for removing burrs, punching holes and straightening. After heat treatment, the forgings are sent to the machine shop, where milling machines remove the irregularities resulting from the forging operation from certain surfaces of the forgings, and carry out further machining operations (such as the boring of holes for track pins, etc.). The finished links are hardener, covered with rustproof paint and sent either to the assembly shop or to the storehouse.

The removal of forging irregularities by milling requires a considerable number of milling machines. This operation is inefficient and involves considerable expenditure of cutting tools, waste of metal in the form of chips, etc.

In accordance with the preferred method of utilizing this invention, a special mill is provided for removing the forging irregularities in links of tractor and similar crawler chains, which is free of the above-enumerated shortcomings.

The mill has an endless chain actuated by an electric motor and carrying hollow moulds. The latter consist of two hinged mold parts, designed to hold the articles to be therebetween. During movement of the endless chain these articles are pulled through a two-way squeezing device and subjected to plastic deformation.

The mill is equipped with mechanisms ensuring self-centering of the hollow moulds thereby preventing damage to the mill.

Thus, the main purpose of this invention is to provide a device, which makes it possible to dispense with the removably milling of forging irregularities on the surfaces of links by replacing this operation with the plastic deformation of the links.

The purpose of this invention is also to ensure reliable action of the mill, attained by the provision of the above mentioned mechanisms, which ensure self-centering of the hollow moulds and prevent the mill from being damaged.

Further objects and advantages of the invention will be apparent from the following description taken in conjunction with the accompanying drawings wherein.

Figure 1:
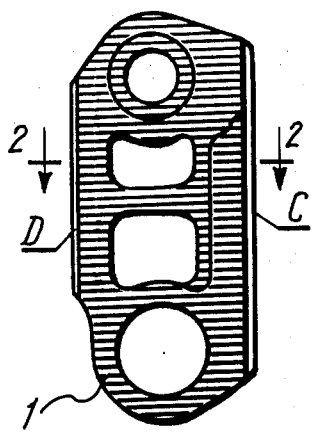
FIG. 1 is a side elevational view showing a blank forging, the type operated upon by the apparatus of this invention.
Figure 2:
FIG. 2 is a sectional view taken substantially on the line 2—2 of FIG. 1.
Figure 3:
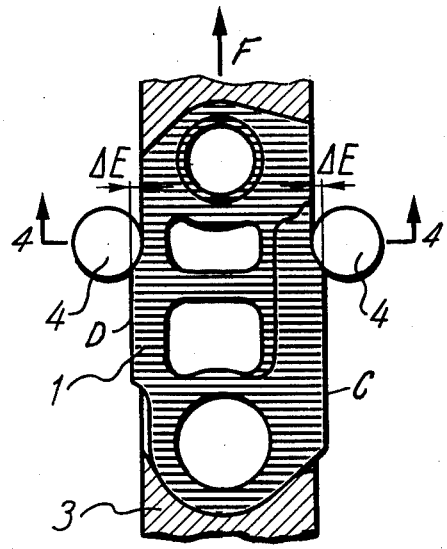
FIG. 3 is a side elevational view with parts in section for greater clarity and showing the forging blank and manner of operation of the rolls of the apparatus of this invention.
Figure 4:
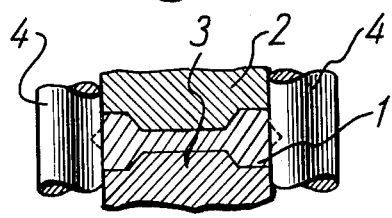
FIG. 4 is a sectional view taken substantially on the line 4—4 of FIG. 3.

The surfaces C and D (FIGS. 1 and 2) of link forging 1 are usually tapered or of general V-shape due to the forging operation while the finished article should have these surfaces flat, as is shown by the dotted line on FIG. 2. Therefore, after burring and straightening the forging on a trimming press, the hot forging is clamped between the top and bottom half-moulds 2 and 3 (FIGS. 3 and 4), which are recessed to fit the shape of the link, the bearing and bearing surfaces C and D remaining exposed.

Figure 5:
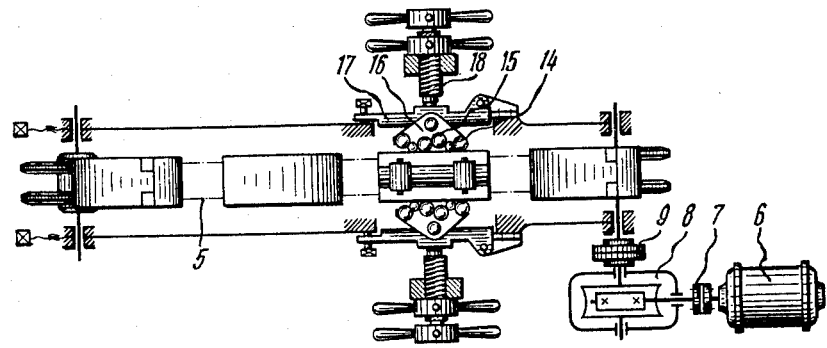
FIG. 5 is a top plan view of a mill constructed in accordance with this invention.
Figure 6:
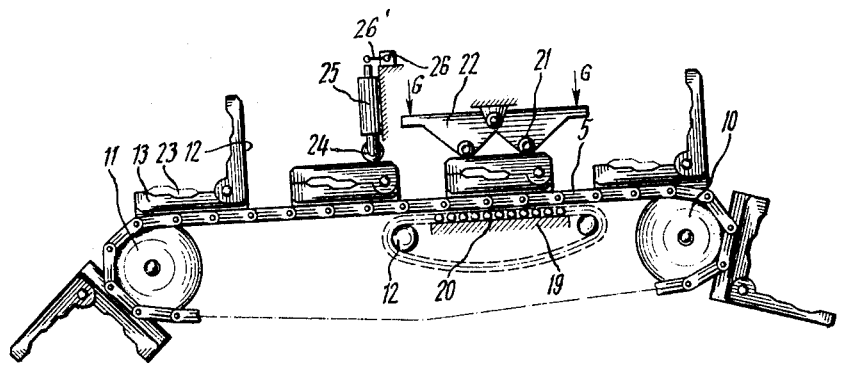
FIG. 6 is a side elevational view of the mill shown in FIG. 5.
Figure 7:
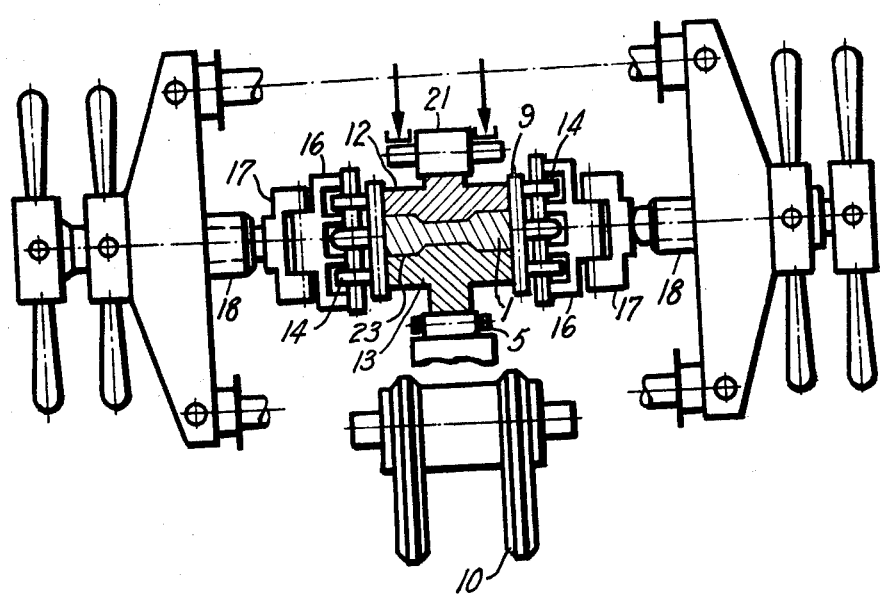
FIG. 7 is an end elevational view of the mill shown in FIG. 5.

After that, the half-moulds with the forging clamped therebetween are conveyed direction of the arrow "F," between rollers 4 of the mill, causing plastic deformation of the forging in the zone of the surfaces C and D by the value of $\Delta E$, thereby flattening these surfaces. The use of small-size rollers 4 reduces the deformation of the link, which makes it possible to retain the inner shape of the link unchanged. The mill for the above mechanical treatment of forged links is constructed in the following manner as shown in FIGS. 5, 6 and 7.

An endless chain 5 is actuated by a drive consisting of electric motor 6, coupling 7, worm reducing gear 8, coupling 9, as well as driving and chain engaging sprockets 10 and 11.

Mounted on chain 5 are hollow moulds consisting of two hinged half-moulds 12 and 13, whose inner cavities are formed to fit the shape of the link to be treated.

The rolling elements of the mill consists of two opposed sets of working and bearing rolls 14 and 15, rotatably mounted in holders 16 which are pivotally mounted on shackles 17. The shackles 17 are pivotally mounted on the mill frame so that the distance between them can be adjusted by means of screws 18. Bearing plate 19 and supporting rollers 20 are mounted below a portion of the upper run of the chain 5 while the mold clamping rollers 21 mounted on a frame 22 are located over this portion of the chain 5. The direction and location of the force applied for clamping the half-moulds is shown by arrows G in FIG. 6 of the drawing.

The operation of the mill proceeds in the following sequence. After the burring and straightening operations are completed the forging 23, without additional heating, is placed in the cavity of the bottom half-mould 13. During movement of the half-mould towards the clamping device, the top half-mould 12 engages the roller 24 thereby closing the mould to clamp the forging therein. If for some reason or other the half-moulds fail to close tightly, roller 24 of mechanism 25, used for preliminary closing of the half-moulds, moves upwards and in turn lifts the actuating rod 26' of limit switch 26. This stops the drive motor 6 and thereby prevents the mill from being damaged.

During further movement of the chain 5 the half-moulds move into engagement with the clamping rolls 21. As a result the half-moulds clamp the forging in place during movement therebetween the bearing and clamping rollers 20 and 21, and between working rolls 14 to roll flat the surfaces C and D.

When the forging leaves the clamping rolls 21, the half-moulds open up and release the forging. When the half-moulds pass around driving sprocket 10, the forgings are dumped into a box.

The use of plastic deformation instead of milling the surfaces C and D of the links will decrease the amount of metal wasted 6 or 7 times, reduce considerably the number of workers employed, free a large number of milling machines and production space, reduce the cost of electric power consumed, etc.

The mill of this invention may be used not only for rolling chain links, but also for producing other mass-production articles from metal blanks.

By changing the half-moulds and altering the surface shape of the working rolls, it is possible to produce articles with shaped rolled surfaces. It should be noted that the unrolled part of the article thus produced remains undistorted, a result difficult to attain by other methods of metal working.

It will be obvious to those skilled in the art that various changes may be made in the invention without departing from the spirit and scope thereof and therefore the invention is not limited by that which is shown in the drawings and described in the specification, but only as indicated in the appended claims.

What we claim is:

1. A mill for simultaneously rolling two, opposite surfaces of a metal blank, said mill comprising a motor actuated, endless chain carrying two part hinged molds for holding the blank to be rolled, and pressure means arranged along said chain on opposite sides of said blank, whereby said blank can be inserted in said molds and pulled between said pressure means to deform said two surfaces.

2. A mill as defined in claim 1, in which each pressure means comprises a holder, a set of working and bearing rolls rotatably mounted on said holder, a shackle pivotally mounted adjacent one side of said chain for movement toward and away from said chain, said holder being pivotally mounted on said shackle, and adjustable means engaging said shackle to move said holder and rolls toward or away from said chain, the pivotal mounting of said holder providing for rocking movement thereof and centering of said blank with respect to said pressure means.

3. A mill as defined in claim 1, including means for closing said molds to hold said blank and limit switch means actuated by said closing means for stopping said motor upon incomplete closing of a mold to thereby prevent damage to the mill.

4. A mill as defined in claim 1, including means for clamping the parts of said molds together, said clamping means comprising clamping rolls disposed above said chain for engaging the upper mold part during movement thereof between said pressure means, means for adjusting said clamping rolls, and supporting rollers disposed below and in engagement with said chain below said clamping rolls.

References Cited by the Examiner
UNITED STATES PATENTS 1,932,504  10/1933  Biggert _____ 29—35

CHARLES W. LANHAM, *Primary Examiner.*

C. H. HITTSON, *Assistant Examiner.*